W. L. McLAUGHLIN.
APPARATUS FOR TREATING FUEL.
APPLICATION FILED SEPT. 25, 1918.

1,336,364.

Patented Apr. 6, 1920.
14 SHEETS—SHEET 3.

W. L. McLAUGHLIN.
APPARATUS FOR TREATING FUEL.
APPLICATION FILED SEPT. 25, 1918.

1,336,364. Patented Apr. 6, 1920.
14 SHEETS—SHEET 8.

W. L. McLAUGHLIN.
APPARATUS FOR TREATING FUEL.
APPLICATION FILED SEPT. 25, 1918.

1,336,364.

Patented Apr. 6, 1920.
14 SHEETS—SHEET 9.

W. L. McLAUGHLIN.
APPARATUS FOR TREATING FUEL.
APPLICATION FILED SEPT. 25, 1918.

1,336,364. Patented Apr. 6, 1920.
14 SHEETS—SHEET 14.

UNITED STATES PATENT OFFICE.

WILSON L. McLAUGHLIN, OF DECATUR, ILLINOIS.

APPARATUS FOR TREATING FUEL.

1,336,364.  Specification of Letters Patent.  Patented Apr. 6, 1920.

Application filed September 25, 1918. Serial No. 255,618.

*To all whom it may concern:*

Be it known that I, WILSON L. McLAUGHLIN, a citizen of the United States, residing at Decatur, in the county of Macon and State of Illinois, have invented certain new and useful Improvements in Apparatus for Treating Fuel, of which the following is a specification.

This application is a continuation, in part, of my pending application, Serial No. 182,243.

My invention relates to the treatment of fuel, and the primary object of the invention is to provide an apparatus for comminuting, drying and then reducing to an impalpable powder, ordinary coal or coal refuse known as "sludge" or "culm", peat, lignite or other combustible materials of like character which for convenience will be referred to hereinafter as "coal," the specific object of the invention being the production of a fuel which will have certain novel characteristics and properties making it extremely valuable as a fuel.

The invention consists in the novel and improved constructions and devices to be hereinafter described and claimed for carrying out the above stated objects and such other incidental objects as will appear from the following description of a preferred embodiment of the invention shown in the drawings annexed hereto. In these drawings.

Like characters of reference designate like parts in the several figures of the drawings.

Figure 1:
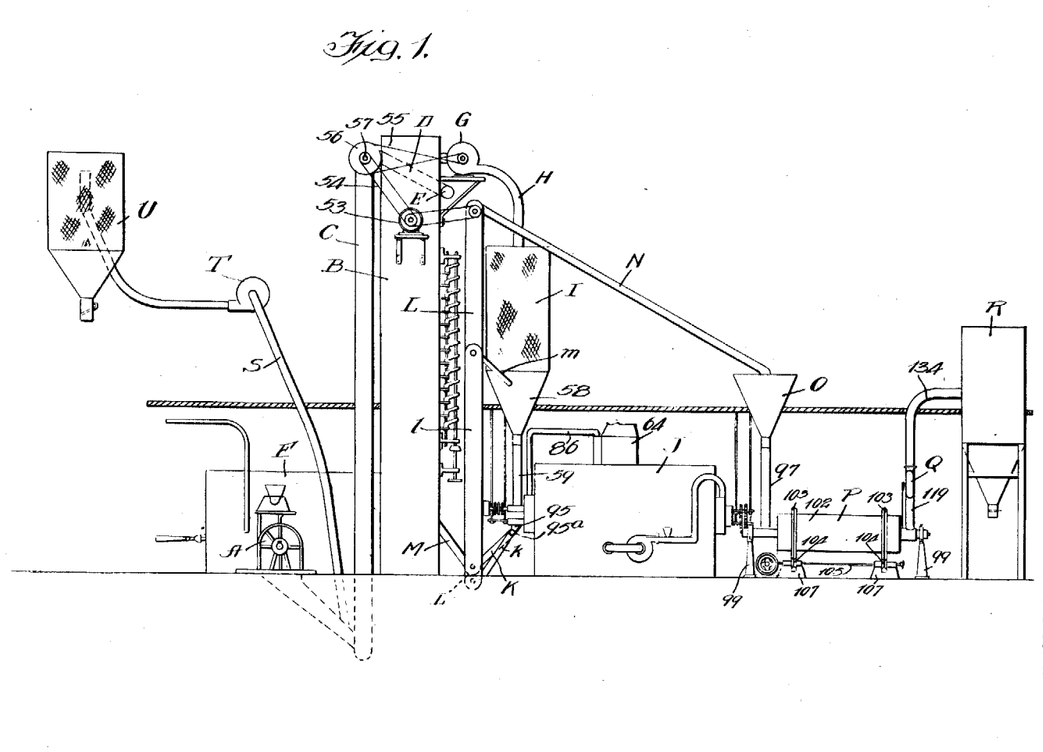
Figure 1 is a general view, in elevation, of the entire apparatus.

Referring first to Fig. 1, the apparatus consists, in the preferred embodiment of the invention herein shown and to be described, of the following instrumentalities by which the coal culm or sludge or other material is treated to produce a fuel having the desired characteristics: If the raw material is not already in comminuted form it is reduced to a fine granular state,—preferably sufficiently fine to pass a two hundred mesh screen—by being ground in the comminuter A. It is then elevated to the top of the drying tower B by a chain bucket elevator C and passes by gravity on a chute D to the other side of the tower where it is distributed uniformly across the tower by a distributing conveyer E, which introduces the material into the tower so that it may fall to the bottom of the same. Heated air or other drying gas or gases is supplied to the bottom of the tower by means of a furnace F, which is shown as a furnace adapted to consume the fuel of my invention although this is not essential. The hot gases are withdrawn from the top of the tower by a suction fan G and as the gases so withdrawn from the tower will ordinarily carry with them some of the undried material in suspension the eduction pipe H of the fan leads to a dust collector I, preferably of the bag collector type. The gases escape through the fabric of the bag and the fuel is passed through a drier J, which I deem the more economical way of handling the material although the material from the dust collector I might be returned to the drying tower B. If the material, after passing through the drier J, is not thoroughly dried, it is passed through chute $k$ to an elevator $l$ which returns it to the hopper of the dust-collector I through a chute $m$. This material is then passed through the drier J. When the material is thoroughly dried, it passes from drier J through chute K to a bucket elevator L, the dried material from the tower passing through a similar chute M to the same elevator. This elevator delivers the dried material through a pipe N from which it passes to hopper O and to a pulverizer P in which the fuel is reduced to an extremely fine, substantially impalpable powder. The powder is drawn off from the pulverizer by a suction fan Q and is separated from the air in a dust collector R. A small portion of the material passed through the comminuter A may be sufficiently fine and dry to meet all the requirements of the finished product, and if so will therefore require no further treatment. This portion of the material, being in suspension, is carried off through pipe S by means of an eduction fan T, and is delivered to a dust collector U which is preferably of the same construction as the dust collector I.

In Figs. 1 to 6 inclusive, I have shown the drying tower, furnace for supplying heated gases thereto, and parts of the apparatus associated therewith. The furnace shown is of a construction suitable for consuming the fuel produced by the apparatus but as the furnace itself is not claimed herein, being the subject matter of the aforesaid application Serial No. 255,619, it will be described only so far as necessary for the understanding of the operation of the drier. For comminuting the fuel prior to drying, when such comminuting treatment is necessary, I may employ any suitable form of impact pulverizer or mill suitable for producing the ordinary so-called pulverized coal used in some types of furnaces. The apparatus for this purpose, indicated at A, need not be described in detail.

Referring now to Figs. 3 to 6 inclusive, the drying tower B contains a plurality of baffle plates 25 arranged at different levels and those at one level in staggered relation with those respectively above and below. These baffles consist of plates secured by means of U-bolts 26 to shafts 27 extending across the tower from front to back. The ends of the shafts at the front of the tower are bent over to form cranks 28 and the cranks of each of the shafts at each level are pivotally connected by a pull rod 29 and the pull rod is connected by a link 30 to a bell crank 31 pivoted on a stationary upright member 32 secured at its upper and lower ends to brackets 33. The several bell cranks are formed with slots 34 through which project pins 35 on a rod 36 which is slidable in the brackets 33, the lower end of the rod being threaded at 37 and engaging a bracket 38 on the tower. The rod is provided at its lower end with a hand wheel 39 and at the end of the threaded portion with a stop collar 40. The baffles are normally in such position that their upper surfaces are horizontal for the purpose of retaining a certain amount of the material which passes through the tower. This saves the baffles from wear. In order to dump this material, when desirable, the rod 36 may be manipulated by its hand wheel 39 to tilt the baffles.

Figures 2, 3, 4:
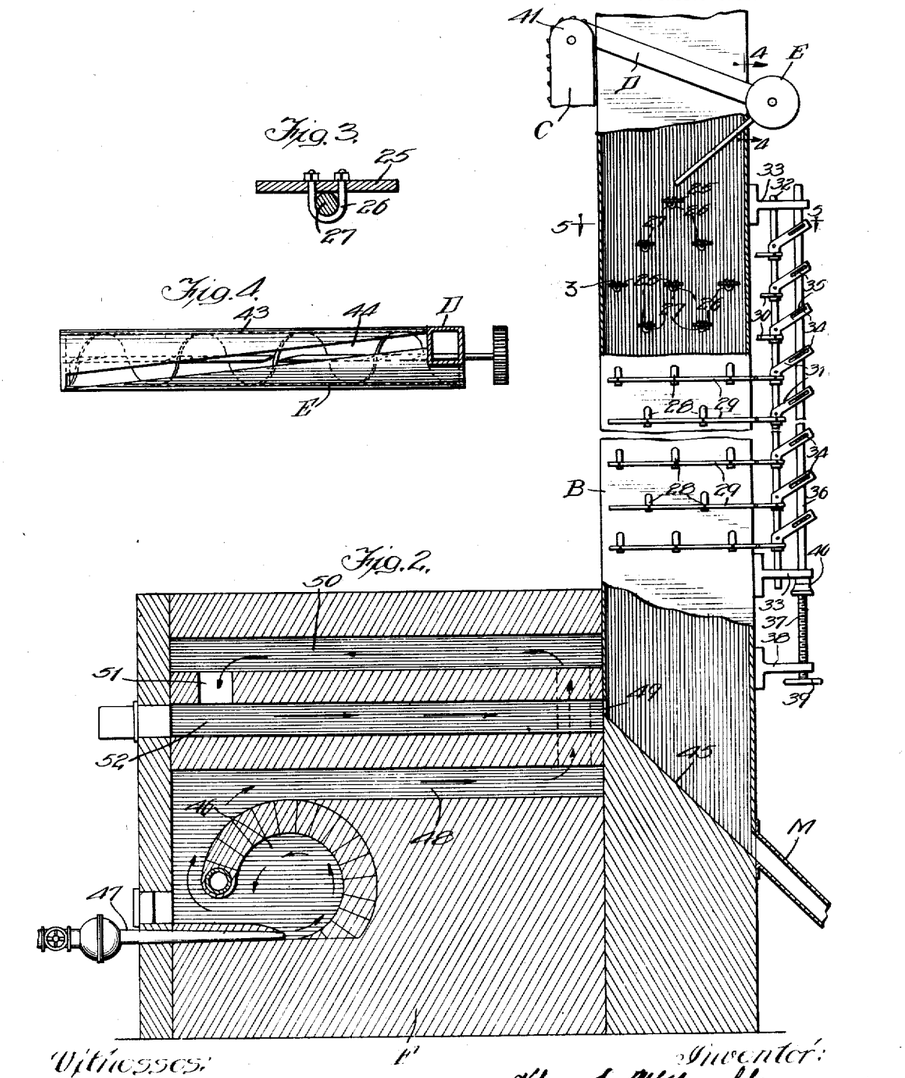
Fig. 2 is a vertical sectional view, with parts in elevation, of the drying tower and furnace associated therewith; by means of which the coal, after being comminuted, is dried.
Fig. 3 is a detail sectional view taken on line 3—3 of Fig. 2, but on an enlarged scale.
Fig. 4 is a sectional view on line 4—4 of Fig. 2.
Figures 5, 6:
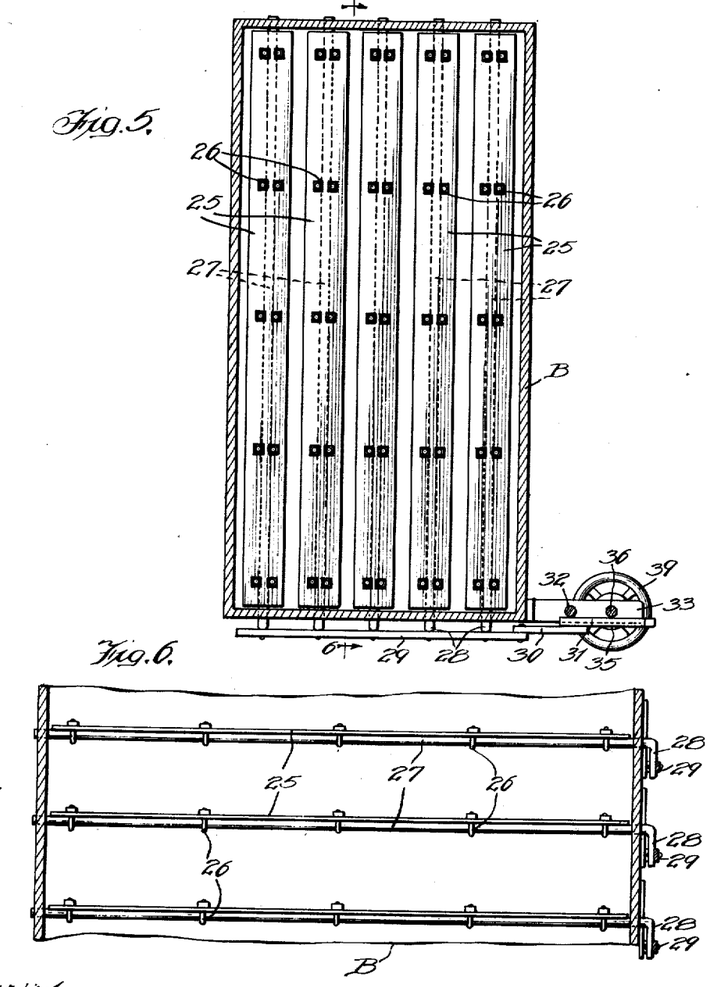
Fig. 5 is a sectional plan on line 5—5 of Fig. 2.
Fig. 6 is a sectional view on line 6—6 of Fig. 5.

The material from the bucket elevator C, the upper sprocket of which is shown at 41, is discharged into the chute D from the lower end of which it passes into the conveyer E from which it is discharged upon a slide 42 in the tower above the baffles. In order that the distribution of the material should be even from front to back of the tower the casing 43 of the conveyer E is formed with a spiral slot 44, the high point of which is at the end of the casing into which the material is delivered from chute D.

The bottom 35 of the tower is inclined to conduct the dry material into the chute M through which the material passes to elevator L and to the pulverizer P.

The furnace F for supplying heat to the tower has an approximately cylindrical combustion chamber 46 into which projects the nozzle 47 through which fuel and air are introduced into the furnace in the proper proportions to insure complete combustion without excess of air as set forth in the divisional application before mentioned. The products of combustion pass from the combustion chamber through a flue 48 which communicates by a vertical flue 49 with a horizontal flue 50 which is connected by a vertical flue 51 with a horizontal flue 52 located between flues 48 and 50. Flue 52 opens into the bottom of the drying tower. This arrangement of flues is to prevent any sparks from entering the drying tower. This is particularly important where the material dried is combustible material like coal.

53 is an electric motor which drives the upper sprocket 41 of the elevator C by means of a belt 54, the fan G being driven by a belt 55 on a sprocket 56 on the same shaft 57 with sprocket 41. The fan will of necessity carry off some of the undried fuel and this passes, with the gases, into the dust collector I which may be of any preferred type, the solid material being collected in the hopper 58 of the dust collector and then passing through pipe 59 into the auxiliary drying apparatus which will be next described, this apparatus being shown in Figs. 7 to 17 inclusive.

Figure 14:
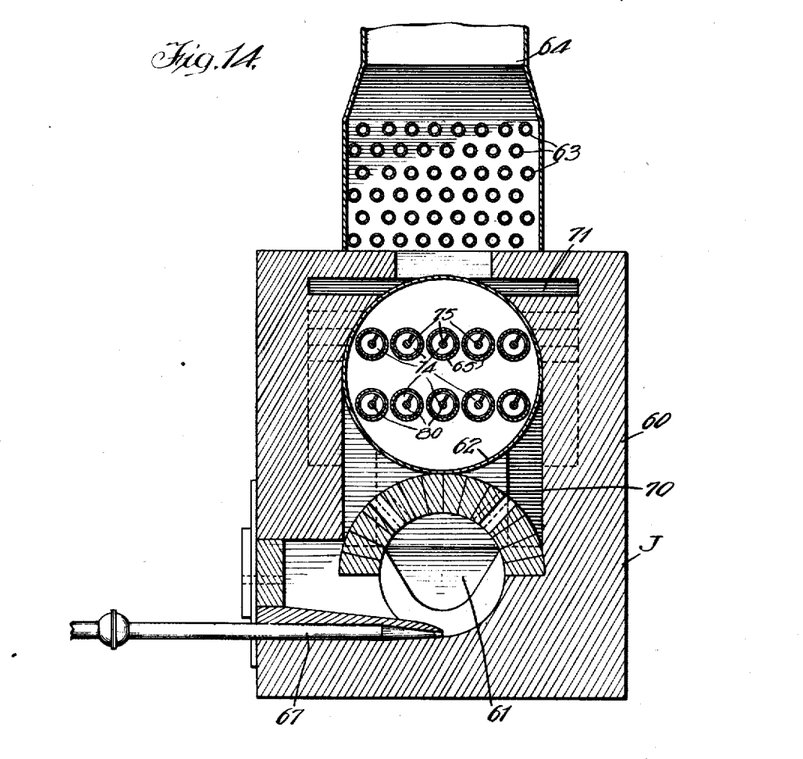
Figs. 14, 15, 16 and 17 are sectional views on lines 14—14, 15—15, 16—16 and 17—17, respectively, of Fig. 7.
Figure 15:
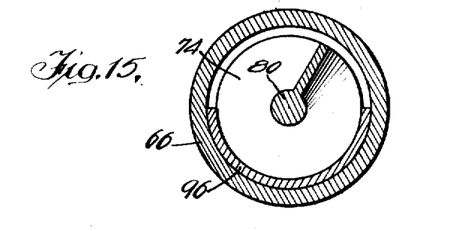
Figure 16:
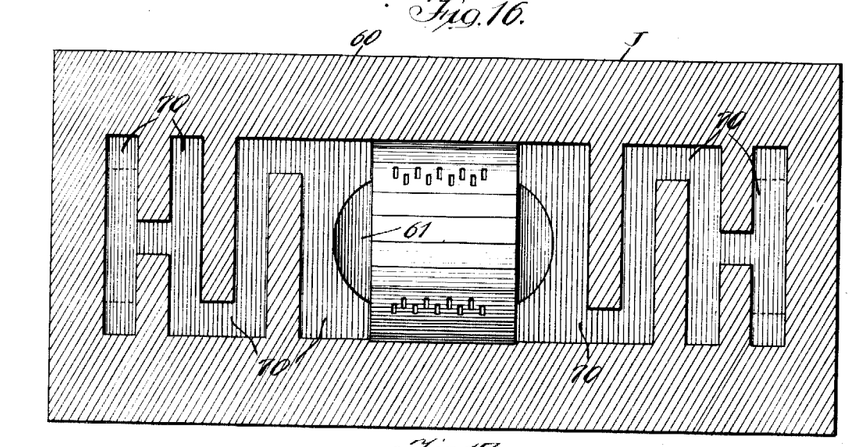
Figure 17:
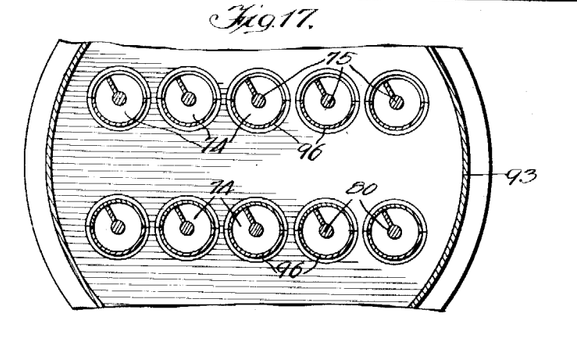
Figure 18:
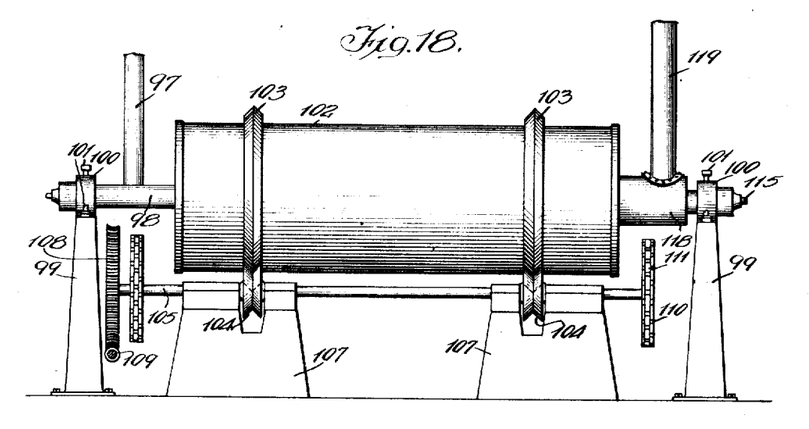
Fig. 18 is a side elevation of the pulverizer or apparatus for reducing the dried coal to an impalpable powder.
Figure 19:
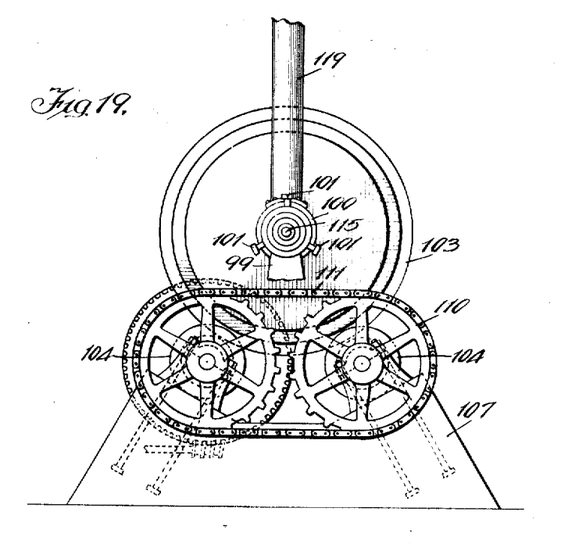
Fig. 19 is a view, in elevation, of the feed end of the pulverizer, the left hand end with respect to Fig. 18, certain parts being broken away and others shown in dotted lines in order to more clearly illustrate other parts.

The drier consists of a furnace structure 60 having a fire box 61, a boiler 62 and air heating pipes 63 arranged in the stack 64. The material to be dried is conveyed through tubular elements 65, 66 which are arranged on two levels and extend lengthwise through the boiler. The furnace is constructed, preferably, so as to use as a fuel the pulverized fuel of my invention, the fuel mixed with air being introduced into the fire box 61 through a nozzle 67 (Fig. 14). The products of combustion from the fire box pass up and down through a system of flues 70 which operate to distribute the heat lengthwise of the furnace, then lengthwise of the furnace above the middle of the boiler through a system of circuitous flues 71 to the stack 64. The air pipes 63 are open at one end to the outside atmosphere and at the other to a hot air box 72.

Figure 7:
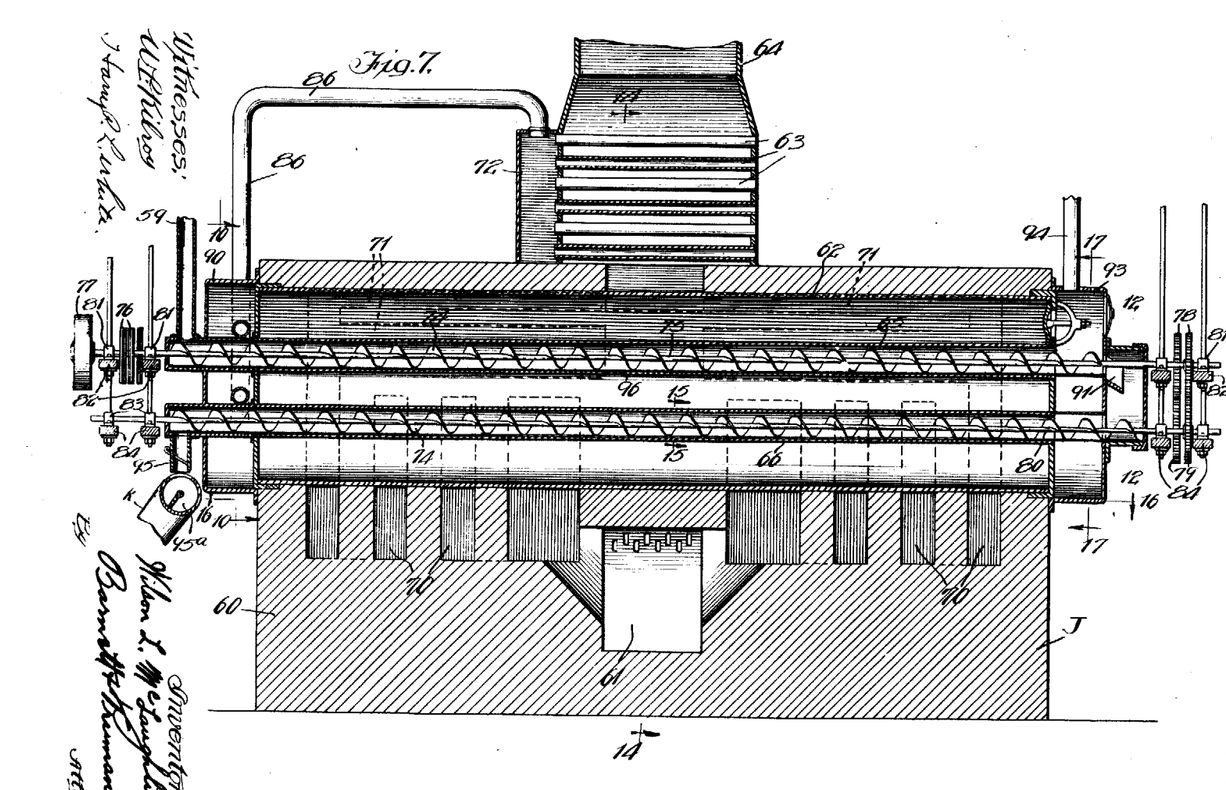
Fig. 7 is a longitudinal, vertical sectional view of a drying apparatus employed for drying certain portions of the coal which, in the preferred operation of the device, is not subject to treatment in the drying tower.
Figures 8, 9:
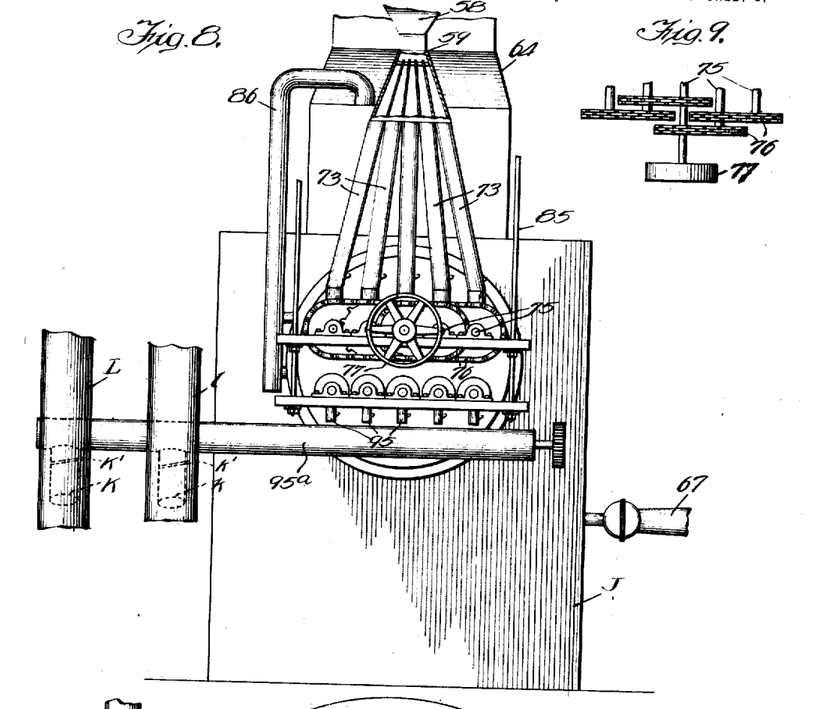
Fig. 8 shows, in elevation, the front or feeding end of the drier of Fig. 7.
Fig. 9 is a detail view further illustrating the arrangement of the driving sprockets shown in Fig. 8.
Figure 10:
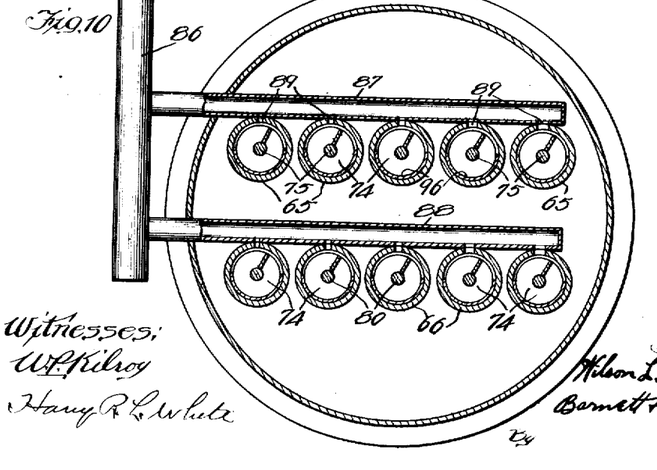
Fig. 10 is a sectional view on line 10—10 of Fig. 7.
Figure 11:
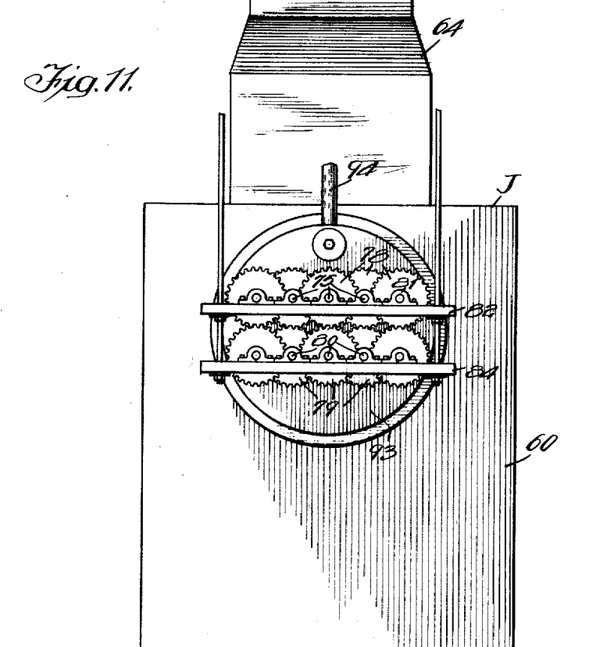
Fig. 11 shows, in elevation, the other end of the drier.
Figure 12:
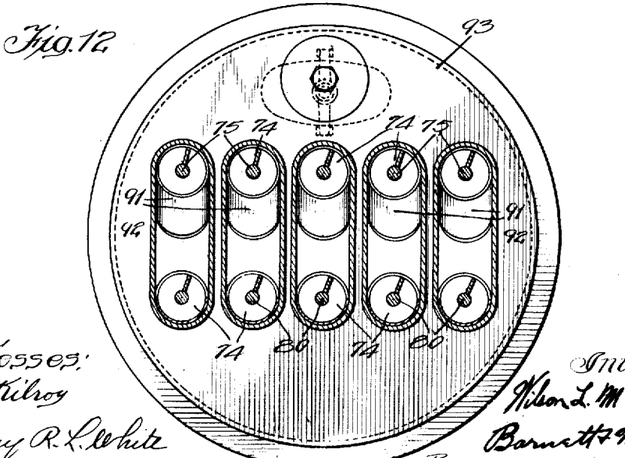
Fig. 12 is a sectional view on line 12—12 of Fig. 7.
Figure 13:
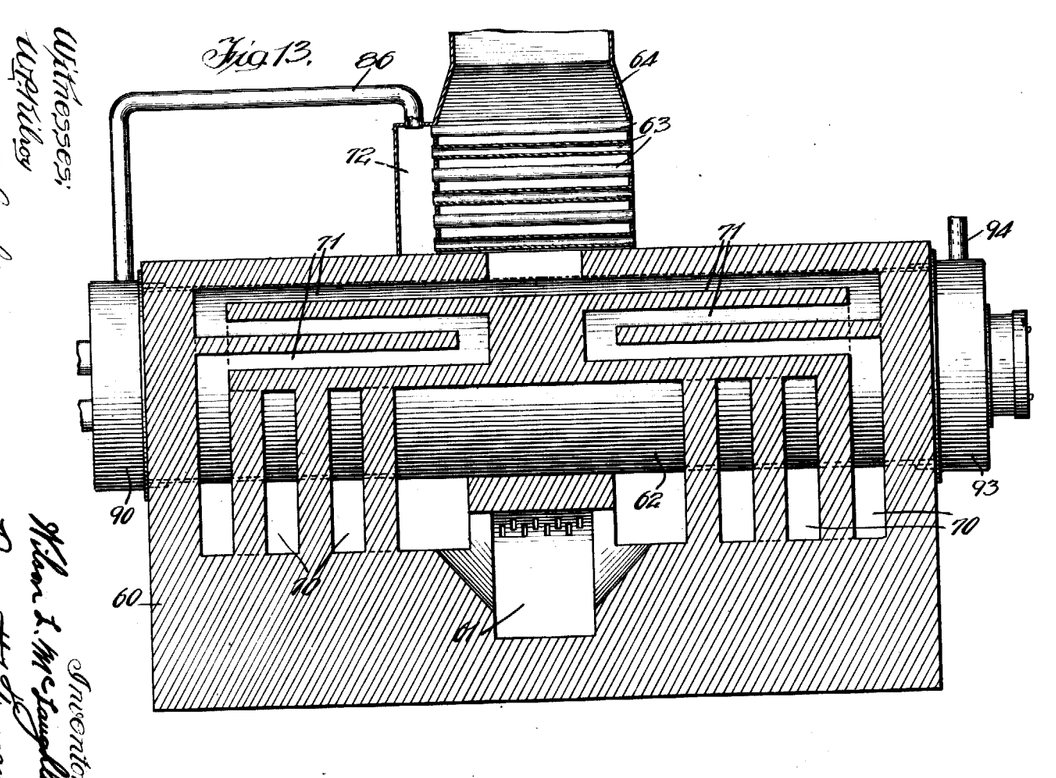
Fig. 13 is a vertical sectional view of the drier taken on a plane to one side of the plane of Fig. 7.

The material from the dust collector I passes from pipe 59 through branch pipes 73 to one or more of the tubular elements 65 of the upper set of tubular elements which have been described as extending through the boiler. Arranged in the tubular elements 65, 66 are screw conveyers 74 and the shafts 75 in the upper set of tubular elements 65 are provided with sprockets preferably arranged as shown in Figs. 8 and 9 so as to be driven in pairs by four link belts 76, one of the shafts 75 being provided with a belt pulley 77. The other ends of shafts 75 are provided with gear wheels 78 each meshing with a gear wheel 79 on one of the conveyer shafts 80 of the lower set of conveyers, the arrangement of gear wheels being shown particularly in Fig. 11. The upper set of shafts are supported in bearings 81 carried on cross pieces 82. The shafts of the lower set are supported in bearings 83 carried by cross pieces 84, the cross pieces 82, 84 being supported by rods 85 from some suitable structure not shown. The air heated in pipes 63 and collected in the hot air box 72 is conveyed through a pipe 86 to manifold pipes 87, 88, one for the upper and one for the lower set of conveyers, the air entering the conveyers through ports 89 which are of gradually increasing diameter toward the ends of the manifolds in order to equalize the distribution of the air as shown in Fig. 10. The manifolds extend through a housing 90 at the end of the boiler. The upper conveyers are provided with chutes 91 which deliver material to the lower set of conveyers, each pair of conveyers, consisting of one of the upper set and one of the lower set, being put into communication by means of a cap or housing 92 into which the chute 91 projects. The conveyers of the lower set extend out into the housings, as shown in Fig. 7. The housings 92 are arranged on the outside of a single housing 93 over this end of the boiler through which all of the tubular elements or conveyer casings 65, 66 extend, the upper set being open to the interior of housing 93. An air and vapor outlet pipe 94 leading from housing 93 preferably extending back to the combustion chamber of the furnace. For example, it may be connected to the nozzle 67 through which fuel is supplied to the combustion chamber. The advantage of this arrangement is that the drying of the fuel by the apparatus just described involves driving off certain combustible, volatile hydrocarbons, such as marsh gas, which may be utilized by being burned in the furnace. The drying in the tower does not have this disadvantage of producing a distillation of the coal.

The upper and lower sets of conveyers operate in opposite directions. The dried material is discharged from the lower set of conveyers through spouts 95 into a conveyer 95$^a$ which delivers it to the chute K and elevator L. If the material is not thoroughly dry after passing through the drier J, the valve K' in the chute K is closed and the valve k' in the chute k opened. This directs the material through chute k to the elevator l which returns it to the collector I. Preferably the tubular elements in which the conveyers operate are provided with semi-cylindrical linings 96 which besides being renewable when worn provide spaces for circulation of air in the upper portions of said tubular elements above the conveyers.

The fuel dried in driers B and J is passed through a pulverizer which reduces it to an extremely fine powder. This apparatus is shown in detail in Figs. 18 to 24 inclusive. The hopper O terminates in a spout 97 which leads to a hollow cylindrical casing 98 mounted at opposite ends on standards 99. The standards terminate in circular bosses 100 through which are threaded set screws 101 (Fig. 23) for centering the casing 98. The casing extends through a cylindrical drum 102 having peripheral bearing rings 103 by means of which it is revolubly supported on two pairs of rollers 104 (the rollers being preferably formed with V-shaped grooves and the bearing rings having a corresponding configuration) which rollers are fixed to shafts 105 carried in bearing boxes 106 supported upon and connected with a suitable foundation 107. One of the shafts 105 has fixed thereto a worm gear 108 driven by a worm 109. The shafts 105 are provided at both ends with sprocket wheels 110 for link belts 111, the purpose of having two pairs of sprockets and two chains being to distribute the power transmitted from one shaft to the other by driving the latter from the former at both ends.

Figure 20:
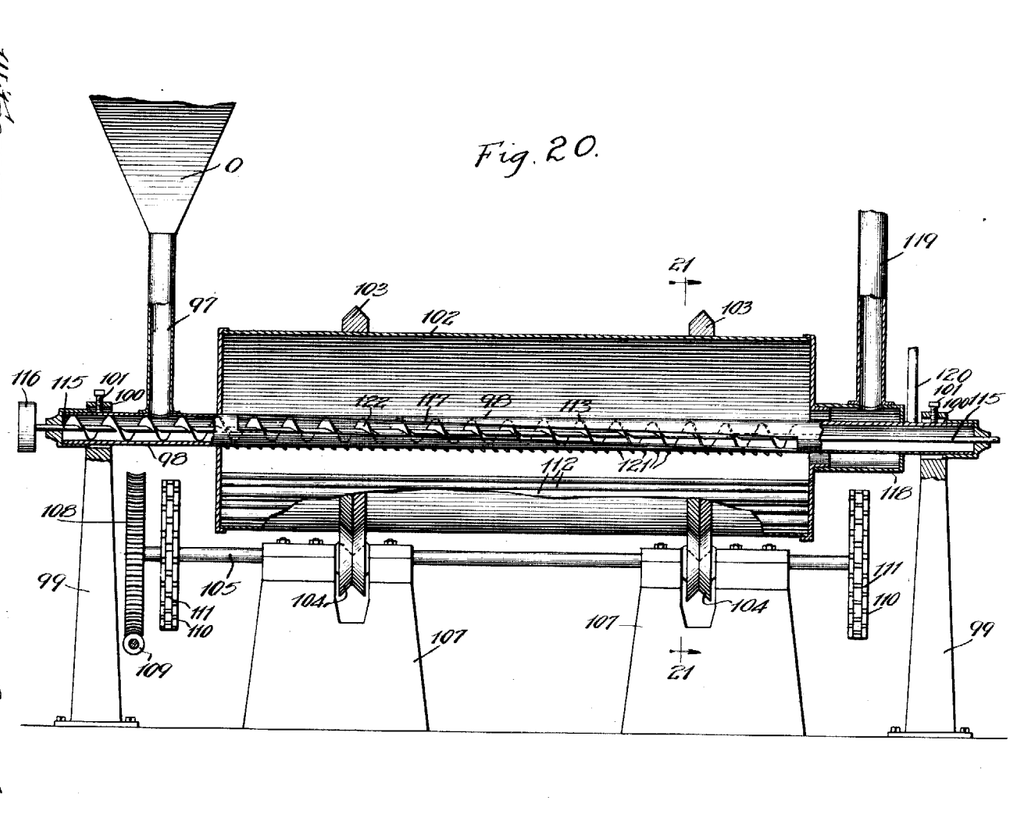
Fig. 20 is a longitudinal vertical sectional view of the pulverizer.
Figure 21:
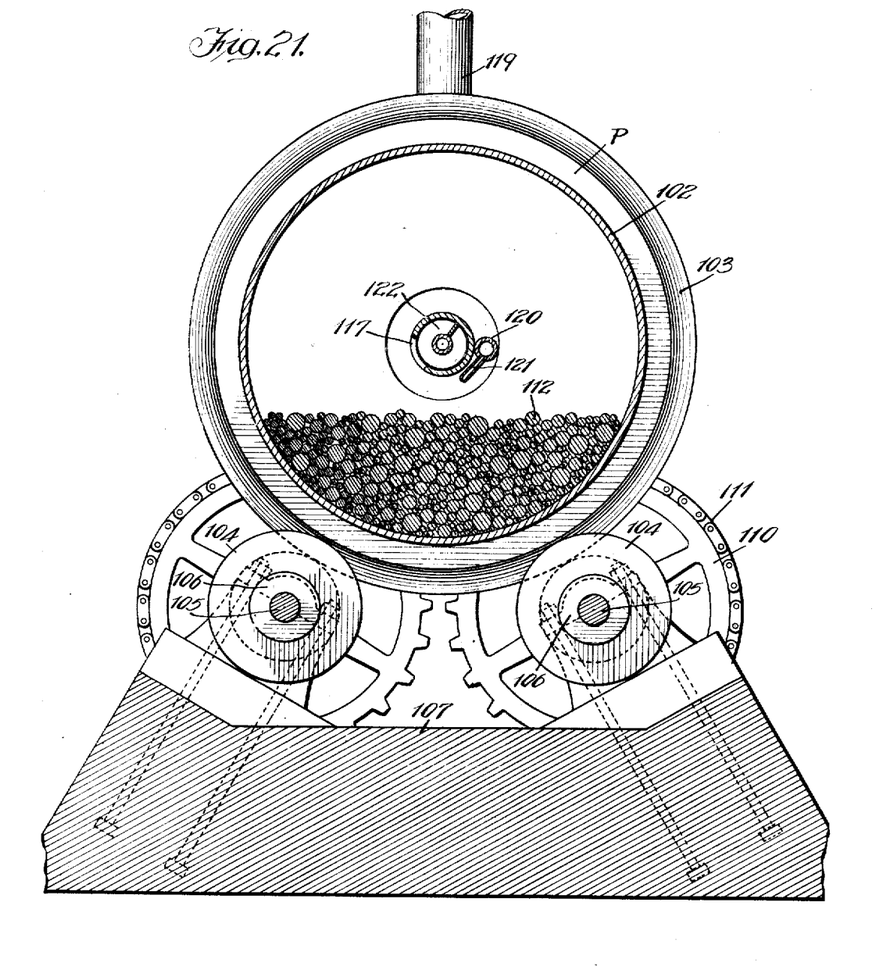
Fig. 21 is a cross-sectional view of the same taken on line 21—21 of Fig. 20.

Within the drum 103 are arranged a plurality of free rolling crushing elements consisting of cylindrical rollers 112 which extend the length of the drum and are of different diameters. The purpose of having the rollers of different diameters is to insure a rubbing or slipping of one roller on the other so as to increase the abrasive action of the rollers on the material treated. The purpose of the pulverizer is to divide the fuel into extremely fine particles, in fact to crush it and grind it to impalpable powder. The ordinary powdered coal used as a fuel in certain types of furnaces is the raw material of my process.

Arranged within the casing 98 is a screw conveyer 113, the shaft 114 of which extends through the caps 115 which close the opposite ends of the casing, the shaft being provided at one end with a driving pulley 116. In order to distribute the material evenly lengthwise of the drum, the casing 98 is formed with a spiral slot 117, the high point of which is at the end of the casing into which the material is delivered and the low point near the other end of the casing. At the discharge end of the drum is arranged a housing 118 from which leads a pipe 119 to the suction fan Q (Fig. 1). In order that only the finest particles should be withdrawn from the pulverizer, I prefer to employ a weak suction and to agitate the material in the drum so that a separation by gravity will take place, which will leave in suspension in the air only those particles light enough to be withdrawn by the suction. To this end compressed air is introduced into the drum through a pipe 120, this pipe being provided with a plurality of air nozzles 121 which are directed downwardly toward the bottom of the drum and obliquely toward the discharge end thereof. The jets of air issuing from these nozzles cause the finer particles of ground material to be suspended in the air. The heavier particles fall back upon the rollers 112. Only those particles which are extremely fine will be light enough to be acted upon by the suction. The latter issue, in the appearance of smoke, through pipe 119 and are separated from the air in the dust collector R.

Figures 22, 23, 24:
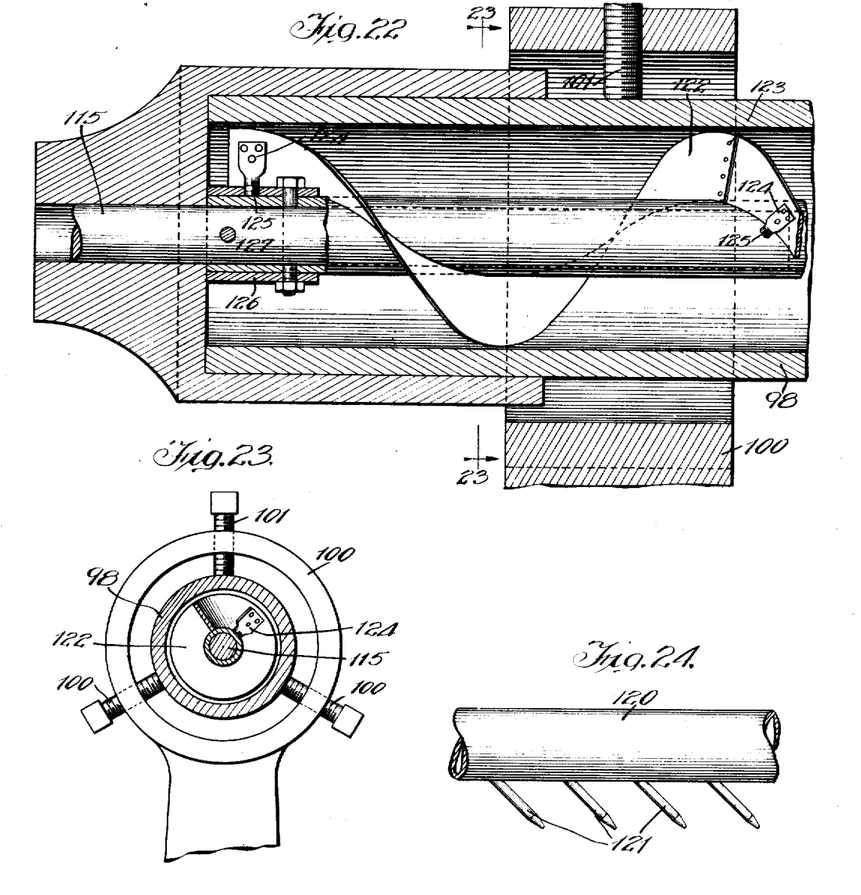
Fig. 22 is a fragmentary sectional view of one end of the distributing conveyer forming a part of the pulverizer.
Fig. 23 is a sectional view on line 23—23 of Fig. 22.
Fig. 24 is a detail view to illustrate the arrangement of certain air blast nozzles in the pulverizer.

Figs. 22 and 23 indicate a construction of the conveyer 113 which is preferred because economical. The flight of the conveyer is made in sections, each section 122 consisting of a ring of metal which is cut on a radial line and bent to spiral form as shown. The sections are overlapped slightly and riveted together, as indicated at 123. They are secured to the flattened ends 124 of studs 125 which are threaded into annular members 126 fastened by bolts 127 to the shaft 115 of the conveyer.

Figure 25:
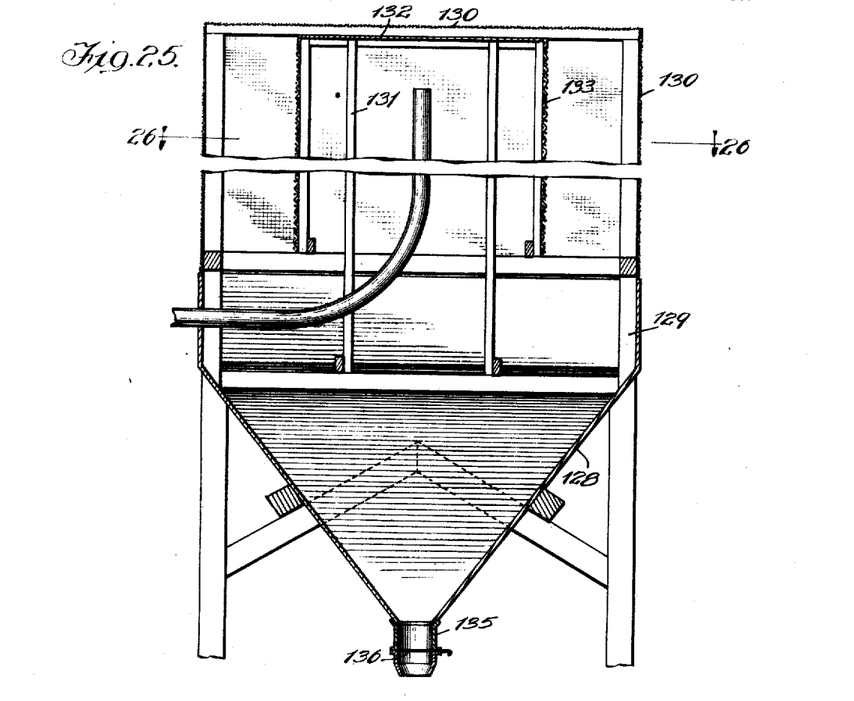
Fig. 25 is a vertical sectional view of a separator for effecting a separation between the pulverized coal and air.
Figure 26:
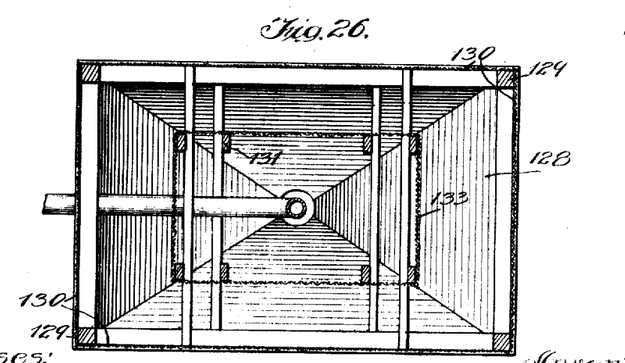
Fig. 26 is a plan view on line 26—26 of Fig. 25.

The fuel being reduced to a very fine powder makes it necessary to employ special means for effecting the separation of the solid particles from the air exhausted from the atomizer. The dust collector, which is preferably employed for this purpose, is illustrated in Figs. 25 and 26. Referring to these figures, 128 is a hopper within the upper edge of which is arranged a framework 129 having a fabric covering 130 on its sides and top. Within this framework and covering is a framework 131 supporting a metal baffle plate 132 at its upper end, the sides being covered by a woven fabric covering 133 preferably of coarser mesh than the fabric 130. A pipe 134 leads from the pump Q into the space within structure 132, 133. The air, with suspended particles, is delivered from pipe 134 against the baffle plate 132 and a considerable quantity of the solid particles fall into the hopper 128, the lower end of which is provided with a spout 135 having a slide valve 136. The air passes out through the inner fabric 133 and then to the atmosphere through the outer fabric 130 which has a finer mesh than fabric 133. Any solid particles which have been able to pass fabric 133 will be intercepted by the outer fabric and precipitated into the hopper. By this arrangement the separation of the solid particles may be effected very completely with rapidity and little chance of clogging.

I seek by my invention to produce a combustible product consisting of fuel of so dry, light and fine a quality that I have termed it "atomized fuel," by analogy to the fine mist of fluid produced by a fluid atomizer, which product, in its preferred form, will be carried by the slightest current or air, giving the appearance of steam or smoke, and will burn in suspension almost instantaneously in a manner suggestive of the combustion of gas, leaving little or no residue and requiring no draft, just enough air being supplied to support combustion and no more.

It is, therefore, of the utmost importance that, having reduced the raw material to the desired fineness and the desired dry condition, I shall be able to collect it without waste and without practical inconvenience.

This material is in so fine and dry a condition that, if projected with any appreciable force against fabric of sufficient fineness of mesh to permit the passage of air carrying this fuel in suspension, a large part of the fuel will be carried through the fabric, not only causing waste, but so permeating the surrounding atmosphere as to make conditions uncomfortable and dangerous, while ultimately such a current will result in clogging the pores of the fabric and stopping separation.

It is, therefore, of the highest importance that the current used, while sufficient to carry the separated material of the desired fineness from the pulverizer, will not be sufficient either to pack the material on the inside of the fabric walls or to carry it through these walls.

The inner separator is probably most useful as a deflector to dissipate what slight air current there is and prevent any direct impact on the outer separator walls.

The separator walls, being of a fabric of sufficiently fine mesh, as above indicated, should be of such area, with reference to the induction pipe leading thereto and the flow of current, that the outflow of the separated air from the collecting chamber shall not carry the fuel through the walls of the chamber, shall not cause the fuel to be packed upon or in the meshes of the fabric, and shall not produce any distinctly appreciable flow of current through the fabric.

For example, in the practical use of my invention, I obtain satisfactory results with an induction pipe six inches in diameter leading to the separation chamber, through which pipe flows a current just sufficient to hold in suspension the material of the required fineness. This six-inch, circular pipe leads to an oblong separation chamber, the fabric walls of which are substantially six feet high, six feet across the narrow ends, nine feet across the longer sides, and the fabric top of which is six feet by nine feet, giving a total fabric separating area of substantially six feet by thirty-six feet, or about two hundred sixteen square feet, through which escapes the air entering through the six-inch pipe. The result is that, while the fabric walls of the separator are slightly bulged so as to take up any slack, these fabric walls, consisting of a good quality of commercial muslin, do not normally show any indication of the powdered fuel on the outside and no outflowing current can be perceived, although the fuel is so fine and dry that if the exterior of the fabric wall be gently tapped the fuel will appear in the form of a fine dust or smoke flowing from the immediate surface tapped.

It will thus be seen that I deflect the immediately inflowing air current with its burden of fuel, and then expand it into a chamber of such size and with permeable walls of such area that the very slight air pressure within the chamber equalizes with the external atmosphere through the walls of the chamber without any of the objectionable results which I find it necessary to avoid.

At the same time, any dangerous gases which may be in suspension in the fuel before being atomized will, by the operation described, become so mingled with and diluted by the air flow and separated from the fuel and passed through the walls of the chamber with the air that they may be carried away by any suitable ventilating device in the room in which these separating chambers are located, and any danger from this direction incident to the storage of my fuel and subsequent handling will be avoided.

While I have described my invention as embodied in certain preferred constructions and arrangements, it will be obvious that the apparatus might be considerably modified without departing from the principle of the invention. Therefore I do not wish to be understood as limiting the invention to the constructions shown and described except so far as certain of the claims are expressly so limited.

I claim:

1. In apparatus for producing powdered coal, the combination of a comminuter for reducing the material to fine, granular form, a drying chamber, means for circulating hot, drying gases through said chamber, means for showering the granular material into the chamber so that it will be dried while passing through said gases, means for withdrawing the gases and vapor from the chamber, and a pulverizer for reducing the dry material to an impalpable powder.

2. In apparatus for producing powdered coal, the combination of a comminuter for reducing the material to fine, granular form, a drying chamber, means for circulating hot, drying gases through said chamber, means for showering the granular material into the chamber so that it will be dried while passing through said gases, a pulverizer for reducing the dry material to an impalpable powder, a separator for separating the powder from the air and an evacuating device having eduction and induction pipes connected with the pulverizer and separator, respectively, for withdrawing the material by suction as it reaches the required degree of pulverization.

3. In apparatus for producing powdered coal, the combination of a comminuter for reducing the material to fine, granular form, a drying tower provided with a plurality of devices at different levels for interrupting the fall of material through the tower, means for causing a draft of hot drying gases to pass upwardly through said tower, means for introducing the granular material into the tower at the top and distributing the same so that it will fall in a shower through the tower whereby it falls against the opposite current of hot gases, means for withdrawing the gases and vapor from the top of the chamber and a pulverizer for reducing the material dried in the tower to an impalpable powder.

4. In apparatus for producing powdered coal, the combination of a comminuter for reducing the material to fine granular form, a drying tower, means for causing a draft of hot, drying gases to pass upwardly through said tower, means for introducing the granular material into the tower at the top and distributing the same so that it will fall in a shower through the tower, a pulverizer for reducing the material dried in the tower to an impalpable powder, means for withdrawing the gases and vapors from the top of the tower, means for separating particles in suspension from said gases and vapors and means for drying said solid particles.

5. In apparatus for producing powdered coal, the combination of a comminuter for reducing the material to granular form, a drying tower, a furnace, means for introducing hot gases from the furnace into said tower at the bottom, means for introducing the granular material into the tower at the top and distributing the same so that it will fall in a shower through the tower, a pulverizer for reducing the dried material to an impalpable powder, an evacuating device having eduction and induction pipes connected with the pulverizer and separator, respectively, for withdrawing the material from the pulverizer as it reaches the required degree of pulverization, means for withdrawing the gases and vapor from the tower, means for separating the solid suspended particles from said gases and vapor and means for drying said solid particles.

6. In apparatus for reducing coal to an impalpable powder, the combination of means for comminuting the material to fine granular state, a drying chamber, means for showering the granular material through the chamber, means for causing hot gases to be passed through the chamber and withdrawn therefrom with the vapor from the drying operation, a revoluble drum having cylindrical pulverizing elements therein free to roll and tumble over each other, means for introducing the dried material into and distributing the same uniformly throughout the length of the drum, means for introducing compressed air into the drum in quantities uniform throughout the length of the drum to separate the finest particles from those less finely pulverized and to suspend the finest particles in the air, and means for exhausting the air from the drum to continuously withdraw said finest particles so suspended.

7. In apparatus for reducing coal to an impalpable powder, the combination of means for comminuting the material to a fine granular state, means for drying the material while in this state, a pulverizing apparatus for reducing the dried material to an impalpable powder, means for causing the finest of the particles to be separated from those less finely pulverized and for suspending said finest particles in the air in the pulverizing apparatus, and means for exhausting the air from the pulverizing apparatus to continuously withdraw said finest particles so suspended.

WILSON L. McLAUGHLIN.